Jan. 10, 1928.  1,656,063

H. T. HARRISON

MACHINE FOR CUTTING UP SCRAP STEEL

Filed Jan. 25, 1923  3 Sheets-Sheet 1

Jan. 10, 1928.

H. T. HARRISON 1,656,063

MACHINE FOR CUTTING UP SCRAP STEEL

Filed Jan. 25, 1923     3 Sheets-Sheet 3

Jan. 10, 1928.
H. T. HARRISON
1,656,063
MACHINE FOR CUTTING UP SCRAP STEEL
Filed Jan. 25, 1923
3 Sheets-Sheet 2
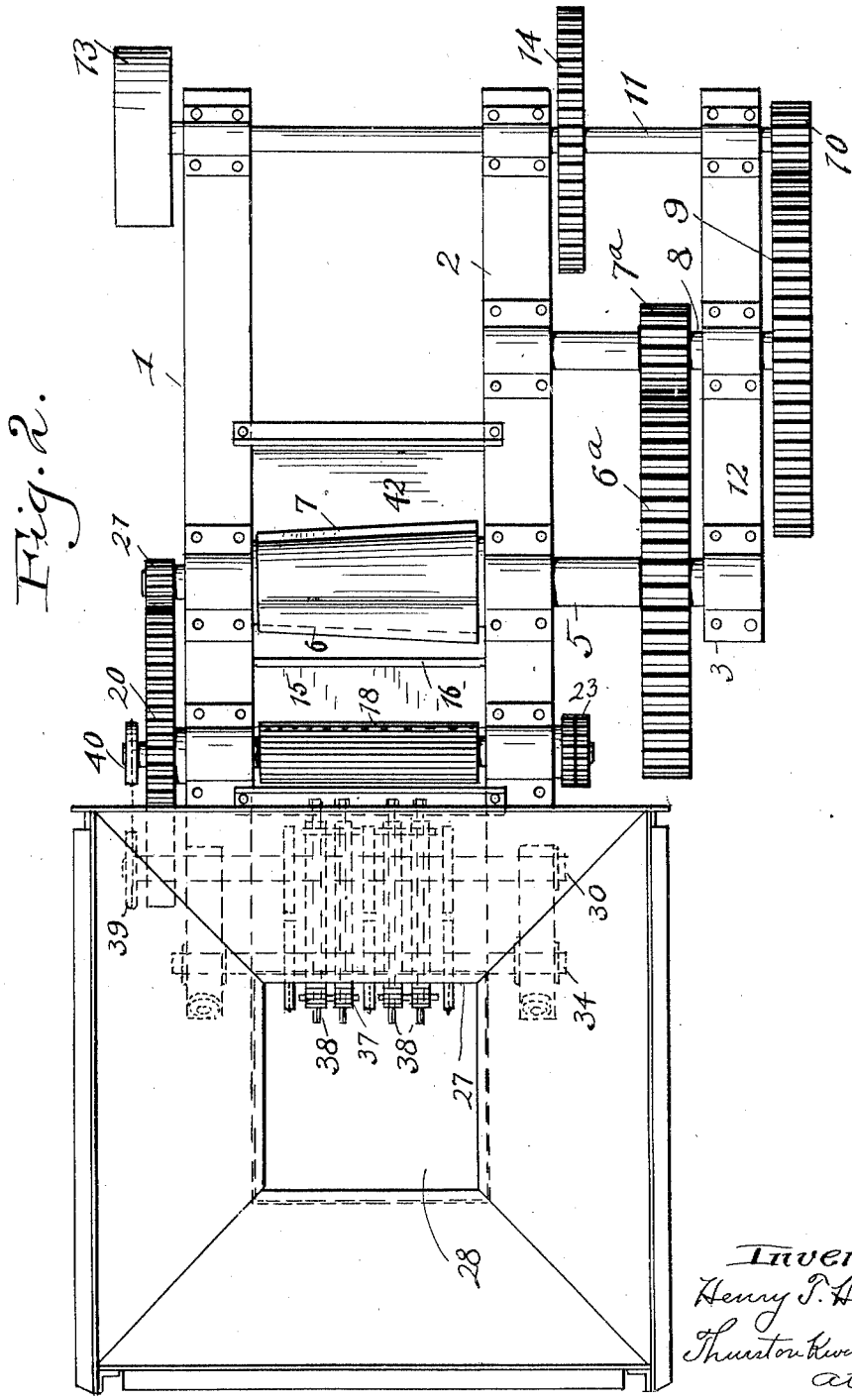

Patented Jan. 10, 1928.

1,656,063

UNITED STATES PATENT OFFICE.

HENRY T. HARRISON, OF CLEVELAND, OHIO, ASSIGNOR TO THE CORRIGAN, McKINNEY STEEL COMPANY, OF CLEVELAND, OHIO, A CORPORATION OF OHIO.

MACHINE FOR CUTTING UP SCRAP STEEL.

Application filed January 25, 1923. Serial No. 614,758.

The present invention relates to a device for cutting up into suitable lengths, strips or long shavings of scrap steel to bring them into proper condition for use as a part of the furnace charge, such as, for instance, in blast furnace practice or other melting operations of similar character.

The steel scrap frequently occurs in strips and pieces of a size which is quite impractical to use as a part of a furnace charge, and the economical treatment of this material to bring it into proper condition must be done at low cost as well as efficiently performed. The herein described machine accomplishes the desired results.

Figure 1:
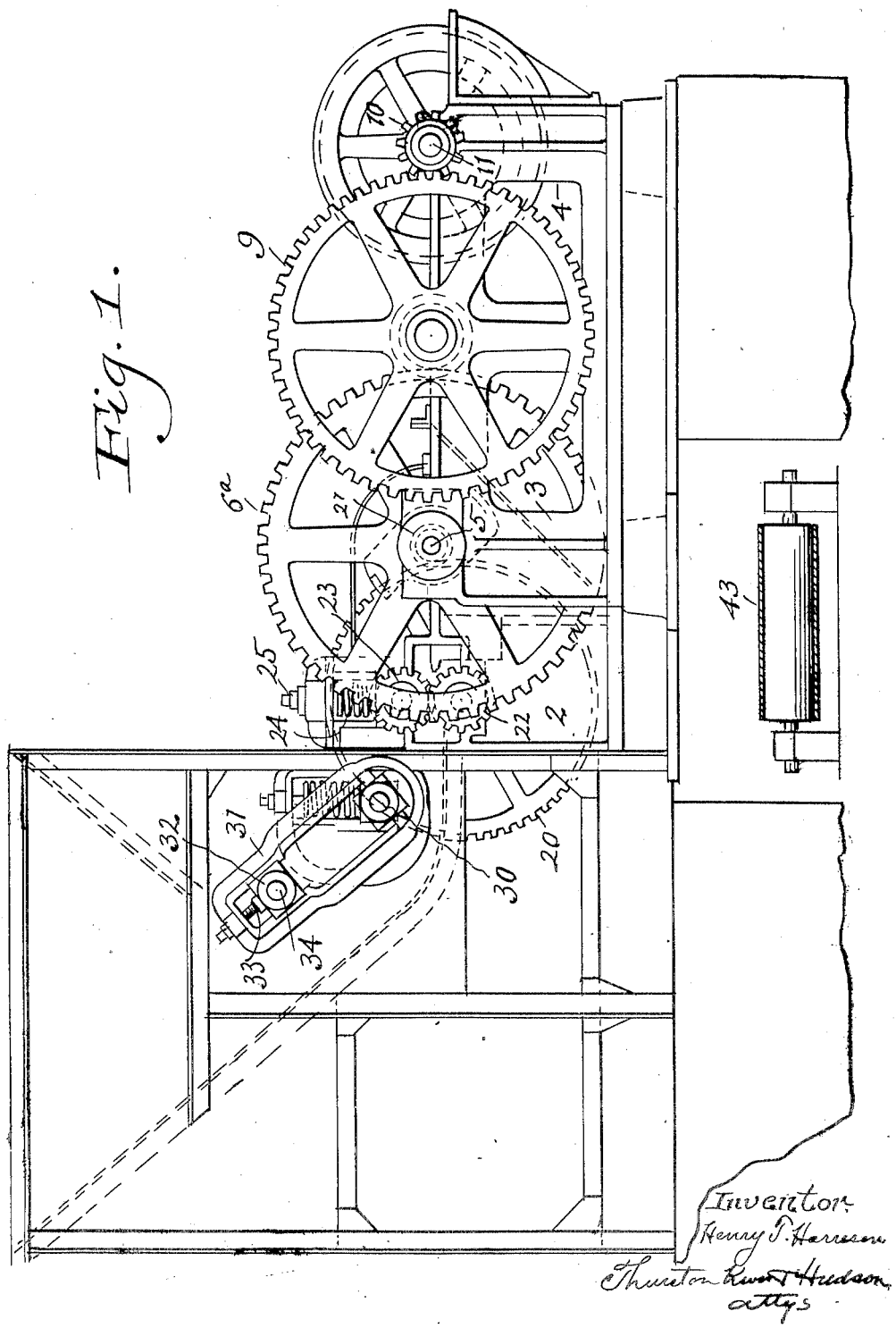
Figure 4:
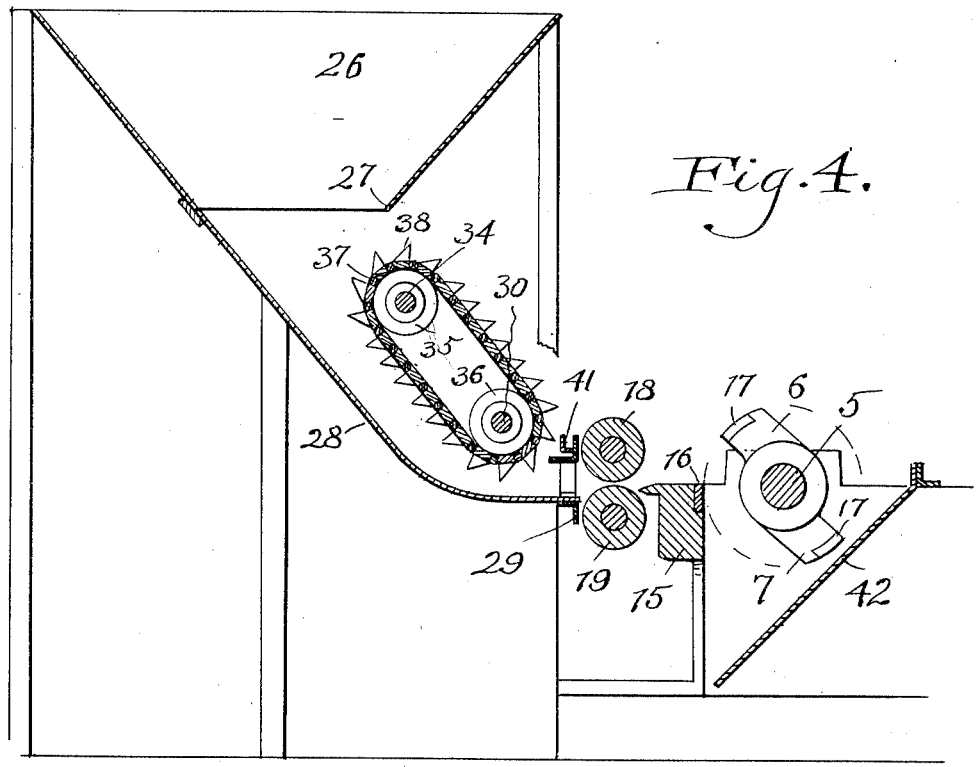
Figure 3:
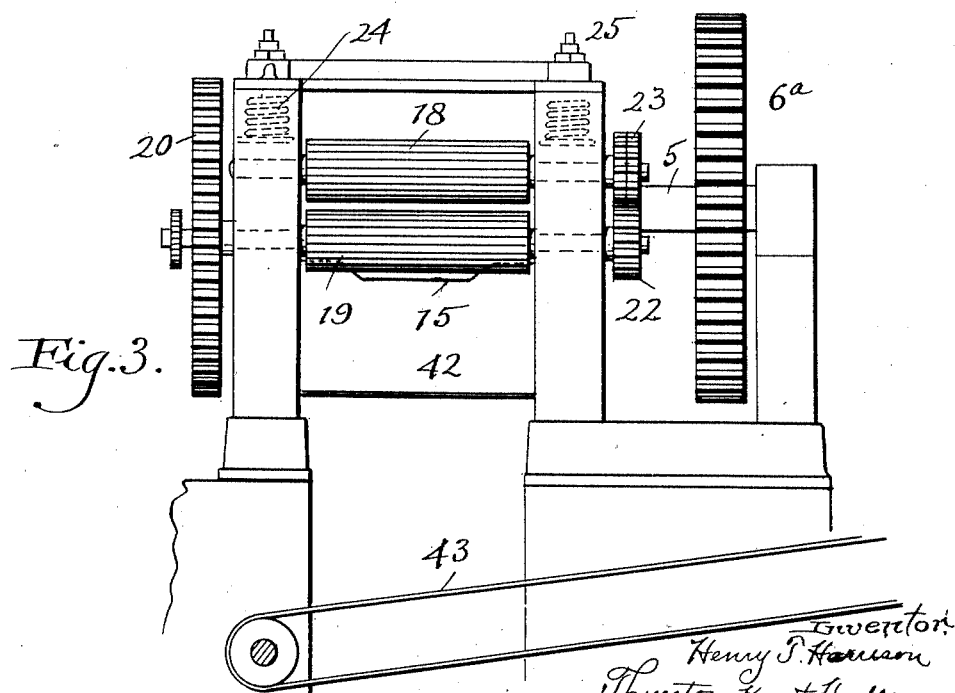

Reference should be had to the accompanying drawings forming a part of this specification, in which Fig. 1 is a side elevation of a device embodying my invention; Fig. 2 is a top plan view of the showing in Fig. 1; Fig. 3 is an end view of the rolls for feeding in the material and the parts adjacent thereto; Fig. 4 is a sectional elevation of a portion of the machine.

The device comprises essentially a pair of side members 1 and 2 which are in turn supported upon upright members which are suitably arranged as indicated at 3 and 4, and the whole apparatus is of course carried upon a suitable foundation or platform.

Extending transversely between the side members 1 and 2 is a shaft 5. This shaft carries certain cutters which are indicated at 6 and 7, two in the present instance being shown, but obviously there may be more or less than that which is shown and described.

The shaft 5 is driven by a gear 6ª which in turn meshes with a smaller gear 7ª, and this gear 7ª is carried upon the shaft 8, as is also a gear 9. The gear 9 is driven by a small gear 10 which is carried at one end of the shaft 11, which shaft is supported in the side members 1 and 2 as well as by a longitudinally extending transverse member, which also serves as a support for one end of the shaft 5 and the shaft 8.

The shaft 11 is driven by means of a pulley 13 at one end thereof, and of course the source of power may be any selected or desired source. The shaft 11 carries a heavy momentum member or fly wheel 14 which serves the usual purpose of a fly wheel in that it steadies the operation of the machine and serves to impart momentum when, due to the cutting operation, there is a retardation of the rotating movement of the cutters due to the shearing operations which they perform.

The gearing arrangement which has been described for operating the shaft 5 is merely a conventional form of reduction gearing, the purpose of which is perfectly evident and it forms no particular part of the present invention.

Extending transversely between the members 1 and 2 is what may be termed a support 15, and to this support there is secured a knife 16 which is so arranged as to co-operate with the cutter carriers 6 and 7.

Each of these cutter carriers 6 and 7 is fixed to the shaft 5 as before described, and each of the members 6 and 7 carries a knife 17, and these are so arranged that there is a shearing action between the cutters 17 and the cutters 16 upon the rotation of the shaft 5.

The material to be operated upon is fed between the cutting members which have been described as the shaft 5 rotates, and the speed of rotation of the shaft together with the speed at which the material is fed in will determine the size of the pieces into which the material being treated is cut.

In front of the transverse member 15 and carried by the side members 1 and 2 are a pair of feeding rolls which are indicated at 18 and 19. These rolls are driven by means of a large gear 20 which meshes with a small gear 21 carried at one end of the shaft 5, and the rollers are preferably fluted or corrugated for the purpose of being able to bite into the material being fed to provide a positive feed.

The lower roller 19 is driven by the large gear 20 as before explained, and the shaft which carries the roller 19 has at one end a gear 22 which meshes with a gear 23 carried at one end of the shaft which has the roller 18 thereon, so that both of the rollers are positively driven.

Moreover, the upper roller is pressed toward the lower roller by springs 24 which are associated with both ends of the upper roller, and the tension of these springs may be adjusted by a screw 25 in a manner which will be well understood.

It will be appreciated that this scrap material when received at a mill is usually shipped in cars, and is simply a mass of material more or less difficult to handle, and it would be, practically speaking, very difficult to feed this sort of material to the feeding rolls 18 and 19 by any hand methods. Therefore, the device provides a hopper 26 which is adapted to receive a large quantity of this sort of material, and the hopper at its lower end has an opening 27 while one side of the hopper 28 extends down beyond the opening 27, and in fact, is extended until it comes to a point adjacent the feeding rolls 18 and 19, the lower end of the extended side member 28 being supported in its proper position by means of a transverse member 29.

Below the hopper 27 there is a mechanism for feeding the material in a systematic and continuous manner, and forcing this material to approach the feeding rolls at a desired rate of speed. This device comprises a series of endless belts, all of which are mounted upon a frame that is movably mounted so that the device may be termed as flexible. There is a transversely extending shaft 30 which is mounted in any suitable standards, and this shaft extends above the member 28 and below the hopper 26. This shaft at its opposite ends has loosely turning thereon end frame members, one of which is indicated at 31 in Fig. 1. These frame members are free to move upon the shaft with an oscillatory movement. The frame members at their outer ends have sliding therein blocks one of which, 32, is mounted in the frame member 31, and is indicated in Fig. 1. Each of these bearing blocks is held in its adjusted position by means of a screw member 33 which is secured to a block 32 and has threaded engagement with a threaded opening in the end of the frame 31. Therefore, the position of the blocks 32 may be adjusted, and consequently the tension on the feed belts which may be later described may be attained.

Mounted in the blocks 32 is a transversely extending shaft 34, and upon this shaft there are mounted a plurality of sprocket wheels, one of which is indicated at 35 in Fig. 4, and likewise, upon the shaft 30 there are mounted a plurality of sprocket wheels one of which is represented at 36 in Fig. 4. The sprocket wheels upon the respective shafts as mentioned are arranged in oppositely disposed pairs so that a sprocket wheel on the shaft 34 and a sprocket wheel on the shaft 30 co-operate to receive a link belt 37 which carries a series of teeth 38.

As before stated, there are a plurality of such belts with teeth extending transversely beneath the opening 27 in the hopper 26.

The shaft 30 is positively driven in any desired manner, as for instance, by means of a sprocket wheel 39 at one end thereof, which is in line with a sprocket wheel 40 carried on the end of the shaft upon which the gear 20 is mounted, and a sprocket chain connects the sprocket wheels 40 and 39.

The operation of the structure which has just been described will be obvious, for the material as it passes through the hopper 26 will be dragged downwardly by means of the teeth on the traveling belts 37, and will be positively fed toward the feeding rolls 18 and 19. Due to the fact that the outer end of this feeding structure which has just been described is free to move, the position of the feeding belts 37 may be varied in accordance with the conditions as to the amount of material which is being fed through the hopper 26.

Just in front of the feeding rollers 18 and 19 there is a transversely extending member which is indicated at 41, which may be termed a stripper. This stripper has a part which extends back toward the feed belts 37, and the material which is being fed by the belts, will pass beneath this member 41, and material which might be wedged in between the teeth will be removed because of the fact that the stripper member will engage it and remove it. This prevents the feeding belts becoming clogged with the metal turnings and smaller bent or twisted pieces of metal which may be a part of the charge passing through the hopper. Obviously the travel of the feed belts 37 is regulated so as to bear a proper speed relation to the operation of the feeding rollers 18 and 19, which are in turn timed in relation to the operation of the shaft 5 which carries the cutters.

Beneath the cutting members 16 and 17 the frame work of the machine is opened so that the cut material may fall by gravity, and there may be employed a diagonally extending member 42 which will serve to shunt the dropping material so as to direct it onto a traveling belt 43 which is beneath the frame of the machine which has just been described. This traveling belt may be of a usual and well known construction, and serves to remove the material as it is cut from beneath the machine, and convey it to any place where it is desired to deposit it, or to deliver it to cars or other receptacles by which it may be conveyed to a place of use or storage.

It is of course within the province of the invention to use other means for removing the cutting material than the particular form of traveling belt which is shown.

Having described my invention, I claim:—

1. A machine for cutting scrap metal comprising a stationary cutting member and a rotary cutting member adjacent thereto, means for compressing the scrap metal and feeding the same to the cutting mechanism at a predetermined rate, and means for delivering the scrap metal to the feeding means.

2. A machine for cutting scrap metal comprising a stationary cutting member and a rotary cutting member adjacent thereto, a pair of opposed rollers for feeding the scrap metal to the cutting mechanism at a predetermined rate, and means for feeding the scrap to the rollers.

3. A machine for cutting scrap metal comprising a stationary cutting member and a rotary cutting member adjacent thereto and having a blade which moves past the stationary cutting member in close proximity thereto, means for compressing the scrap metal and feeding the same to the cutting mechanism at a predetermined rate, and a conveying means beneath the cutting members for receiving the cut material and conveying it away.

4. A machine for cutting scrap metal comprising a stationary cutting member and a rotary cutting member adjacent thereto, means for compressing the scrap metal and feeding the same to the cutting mechanism, and gearing for operating the rotary cutting member and the feeding means in timed relationship.

5. A machine for cutting scrap metal comprising a frame, a driven shaft on said frame, an inertia wheel carried by said shaft, a stationary cutting member, a rotary cutting member mounted adjacent thereto, gearing connecting the driving shaft with the rotary cutting member, and means for feeding the scrap metal to the cutting mechanism at a predetermined rate.

6. A machine for cutting scrap metal comprising a frame, and driven shaft on said frame, an intertia wheel carried by said shaft, a stationary cutting member, a rotary cutting member mounted adjacent thereto, gearing connecting the driving shaft with the rotary cutting member, a pair of feeding rolls adjacent the cutting members said rolls being driven from the driving shaft at a predetermined rate with respect to the rotation of the cutting member.

7. A machine for cutting scrap metal comprising a stationary cutting member and a rotary cutting member adjacent thereto, means for compressing the scrap metal and feeding the same to the cutting members at a predetermined rate, a hopper adjacent the feeding means, and means associated with said hopper for moving scrap metal from the hopper to the feeding means.

8. A machine for cutting scrap metal comprising a stationary cutting member and a rotary cutting member adjacent thereto, means for feeding the scrap metal to the cutting members at a predetermined rate, a hopper adjacent the feeding means, said hopper having an extension which terminates adjacent the feeding means, and means associated with the said extension for moving material to the feeding means.

9. A machine for cutting scrap metal comprising a stationary cutting member and a rotary cutting member adjacent thereto, means for feeding the scrap metal to the cutting members at a predetermined rate, a hopper adjacent the feeding means, said hopper having an extension which terminates adjacent the feeding means, a rotary member associated with the extension on the hopper for moving material to the said feeding means.

10. A machine for cutting scrap metal comprising a stationary cutting member, and a rotary cutting member adjacent thereto, means for feeding the scrap metal to the cutting members at a predetermined rate, a hopper adjacent the feeding means, said hopper having an extension which terminates adjacent the feeding means, means associated with the said extension for moving material to the feeding means, the said means comprising a plurality of endless members having teeth thereon, and means for causing the said endless members to rotate.

11. A machine for cutting scrap metal comprising a stationary cutting member and a rotary cutting member adjacent thereto, means for feeding the scrap metal to the cutting members at a predetermined rate, a hopper adjacent the feeding means, said hopper having an extension which terminates adjacent the feeding means, a shaft mounted transversely with respect to the said extension of the hopper, means for driving said shaft, a frame pivotally mounted on the shaft, a second shaft carried by the frame, rotatable members carried by both of said shafts, endless belt members associated with said rotating members, and projections carried by the endless belts whereby material is moved from the hopper to the feeding means.

12. A machine for cutting scrap metal comprising a hopper for receiving the scrap metal, said hopper having converging walls and a discharge opening, one of the said walls extending beyond said opening, a pair of pressure rolls adjacent the end of said extending wall, a toothed belt above the extending wall for delivering the scrap metal at a uniform rate to the rolls, a stationary cutting member positioned to receive the material from the rolls, a movable cutting member cooperating with the stationary cutting member, and means for driving said rolls, belt and movable cutting member.

13. A machine for cutting scrap metal comprising upper and lower pressure rolls, a hopper having a bottom wall terminating closely adjacent the bottom roll, a frame above the bottom wall and hinged at its forward end adjacent the delivery end of said bottom wall, the rear end of said frame being free to swing, a conveyor belt provided with projecting teeth mounted on said frame and overlying said bottom wall, a fixed cutter member positioned to receive the material from the rolls, a movable cutting member cooperating with said fixed cutting member, and means for driving said rolls, belt and movable cutting member.

14. A machine for cutting scrap metal comprising superposed pressure rolls, a bar parallel with the upper roll and closely adjacent thereto, a bar parallel with the lower roll and closely adjacent thereto, a supporting bed connected with the lower bar, feeding means above said bed for continuously feeding the scrap metal between said bars to the rolls, a fixed cutting member closely adjacent the lower roll and parallel therewith, a movable cutting member cooperating with the fixed cutting member, and means for driving said rolls, feeding means and movable cutting member.

15. A machine for cutting scrap metal comprising superposed pressure rolls, a supporting bar parallel with and closely adjacent the lower roll, a hopper having an inclined bottom wall connected to said supporting bar, a shaft extending transversely over said bottom wall adjacent the lower end thereof, a frame pivoted at its forward end on said shaft, a transverse shaft carried by the rear end of the frame, sprockets on said shafts, endless chains running over the sprockets on said shafts, teeth carried by said chains, a stripper bar parallel with the upper roll and interposed between the roll and said endless chains, a fixed cutting member, positioned to receive the material delivered from the rolls, a movable cutting member cooperating with the fixed cutting member, and means for driving said rolls, chains and movable cutting member.

In testimony whereof, I hereunto affix my signature.

HENRY T. HARRISON.